US010452413B2

United States Patent
Bandi et al.

(10) Patent No.: US 10,452,413 B2
(45) Date of Patent: Oct. 22, 2019

(54) SYSTEM AND METHOD FOR NAVIGATING WEB-BASED APPLICATION PROGRAMS

(71) Applicant: CA, Inc., New York, NY (US)

(72) Inventors: Sreenivasulu Bandi, Telangana (IN); Pramod Kumar Chaturvedula, Telangana (IN); Mitta Sarath Kumar, Telangana (IN); Gaurav Kumar, Bihar (IN)

(73) Assignee: CA, Inc., New York, NY (US)

( * ) Notice: Subject to any disclaimer, the term of this patent is extended or adjusted under 35 U.S.C. 154(b) by 197 days.

(21) Appl. No.: 15/460,299

(22) Filed: Mar. 16, 2017

(65) Prior Publication Data

US 2018/0267813 A1  Sep. 20, 2018

(51) Int. Cl.
  *G06F 9/451* (2018.01)
  *G06F 3/0482* (2013.01)
  *G06F 17/22* (2006.01)
  *G06F 16/958* (2019.01)
  *G06F 16/954* (2019.01)

(52) U.S. Cl.
  CPC ............ *G06F 9/451* (2018.02); *G06F 3/0482* (2013.01); *G06F 16/954* (2019.01); *G06F 16/972* (2019.01); *G06F 17/2235* (2013.01)

(58) Field of Classification Search
  CPC .. G06F 9/4443; G06F 17/2235; G06F 3/0482; G06F 3/04812
  See application file for complete search history.

(56) References Cited

U.S. PATENT DOCUMENTS

| | | | |
|---|---|---|---|
| 6,405,238 B1* | 6/2002 | Votipka | G06F 16/954 709/203 |
| 6,880,006 B1* | 4/2005 | Tagg | G06Q 10/10 709/225 |
| 8,117,197 B1* | 2/2012 | Cramer | G06Q 30/0256 707/731 |
| 9,658,738 B1* | 5/2017 | Park | G06F 3/04817 |
| 9,658,739 B1* | 5/2017 | Freund | G06F 3/04817 |
| 2002/0075332 A1* | 6/2002 | Geilfuss, Jr. | G06Q 30/02 715/859 |
| 2005/0203918 A1* | 9/2005 | Holbrook | G06Q 40/04 |
| 2006/0242638 A1* | 10/2006 | Lew | G06F 9/451 717/168 |
| 2008/0046462 A1* | 2/2008 | Kaufman | G06F 16/26 |

(Continued)

*Primary Examiner* — Hien L Duong
(74) *Attorney, Agent, or Firm* — Meyertons, Hood, Kivlin, Kowert & Goetzel, P.C.

(57) ABSTRACT

A client device facilitates user navigation through a plurality of separate, but intercommunicating application programs that make up an integrated solution, to allow the user to perform desired functions or actions associated with those application programs using minimal effort. In particular, the user's navigation between the application programs are monitored as the user navigates the application programs to perform or invoke a desired function. Information related to the navigation to, and invocation of, the desired function is then stored for subsequent use in creating a list of navigational paths for the user. The navigational paths comprise hyperlinks to the desired functions that, when selected by the user, will navigate the user directly to the desired functions. The navigational paths may be ranked according to their frequency of use by the user.

20 Claims, 11 Drawing Sheets

(56) References Cited

U.S. PATENT DOCUMENTS

| | | | |
|---|---|---|---|
| 2008/0222105 A1* | 9/2008 | Matheny | G06F 17/30867 |
| 2012/0124036 A1* | 5/2012 | Ramos | G06F 17/30274 |
| | | | 707/723 |
| 2012/0151368 A1* | 6/2012 | Tam | G06F 9/451 |
| | | | 715/738 |
| 2012/0159345 A1* | 6/2012 | Gonsalves | G06F 3/0482 |
| | | | 715/745 |
| 2013/0152001 A1* | 6/2013 | Lovitt | G06F 3/0482 |
| | | | 715/765 |
| 2014/0101659 A1* | 4/2014 | Kumar | G09B 19/0053 |
| | | | 718/100 |
| 2014/0229601 A1* | 8/2014 | Zhao | G06F 17/30887 |
| | | | 709/223 |
| 2018/0267813 A1* | 9/2018 | Bandi | G06F 3/0482 |

* cited by examiner

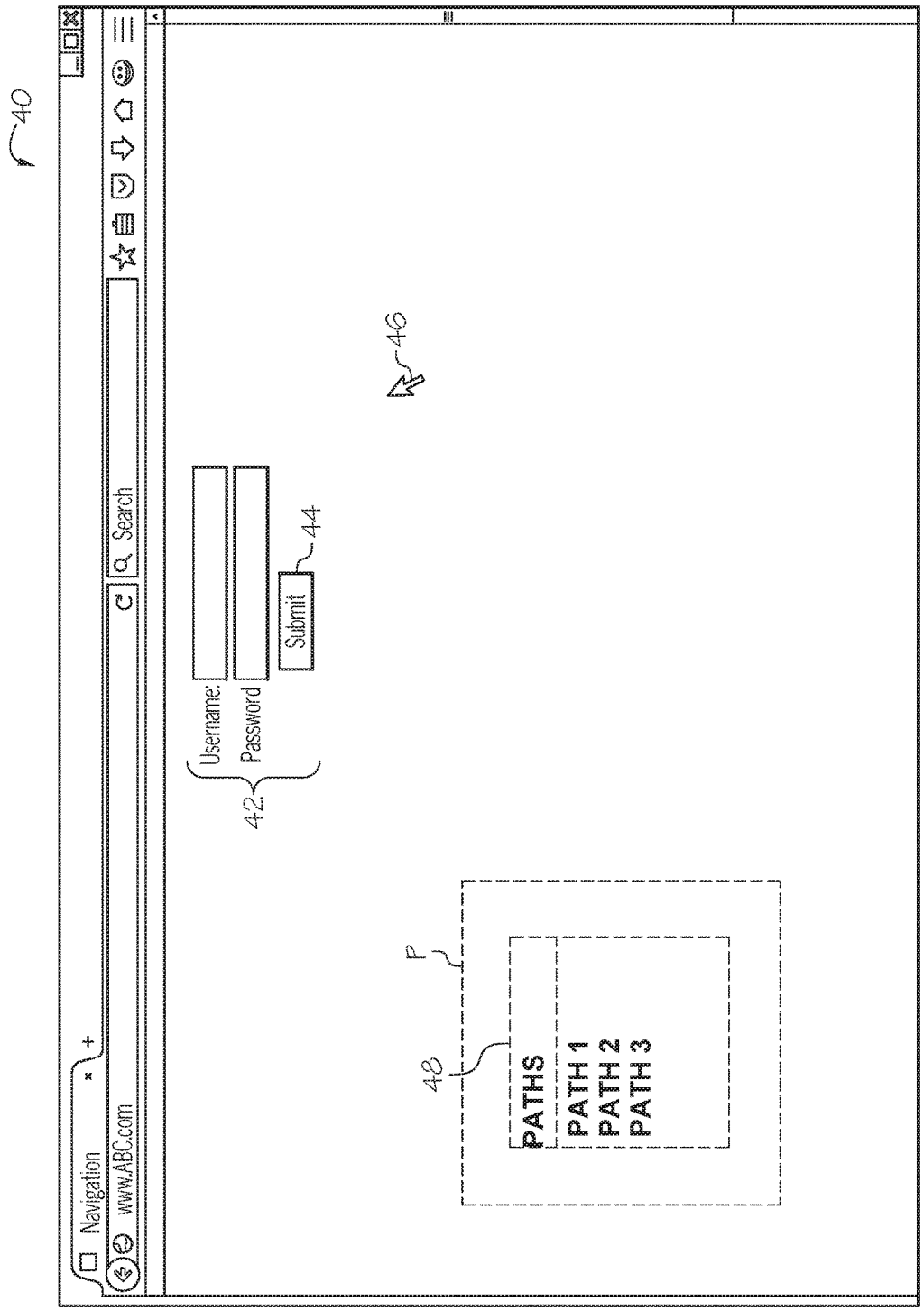

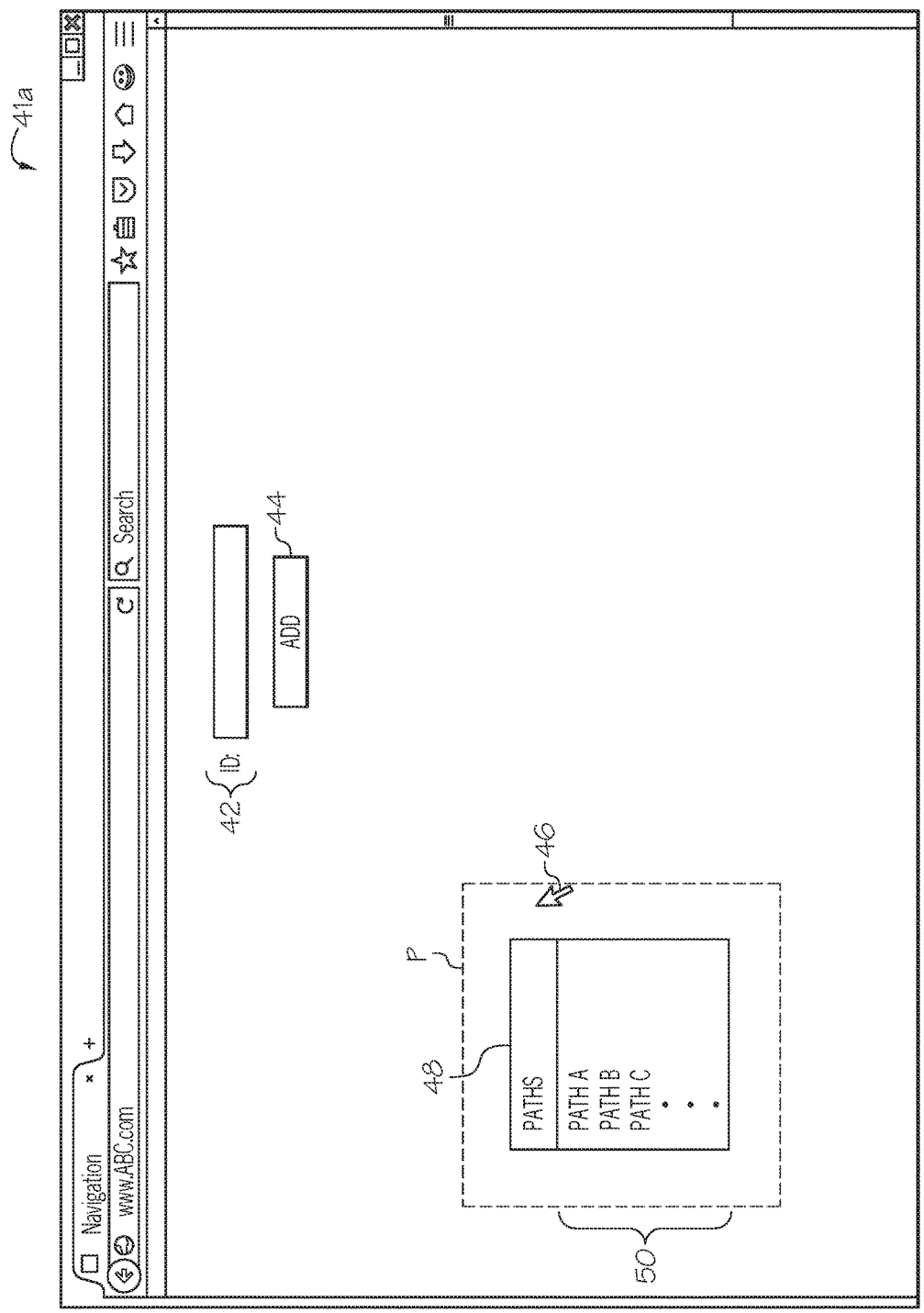

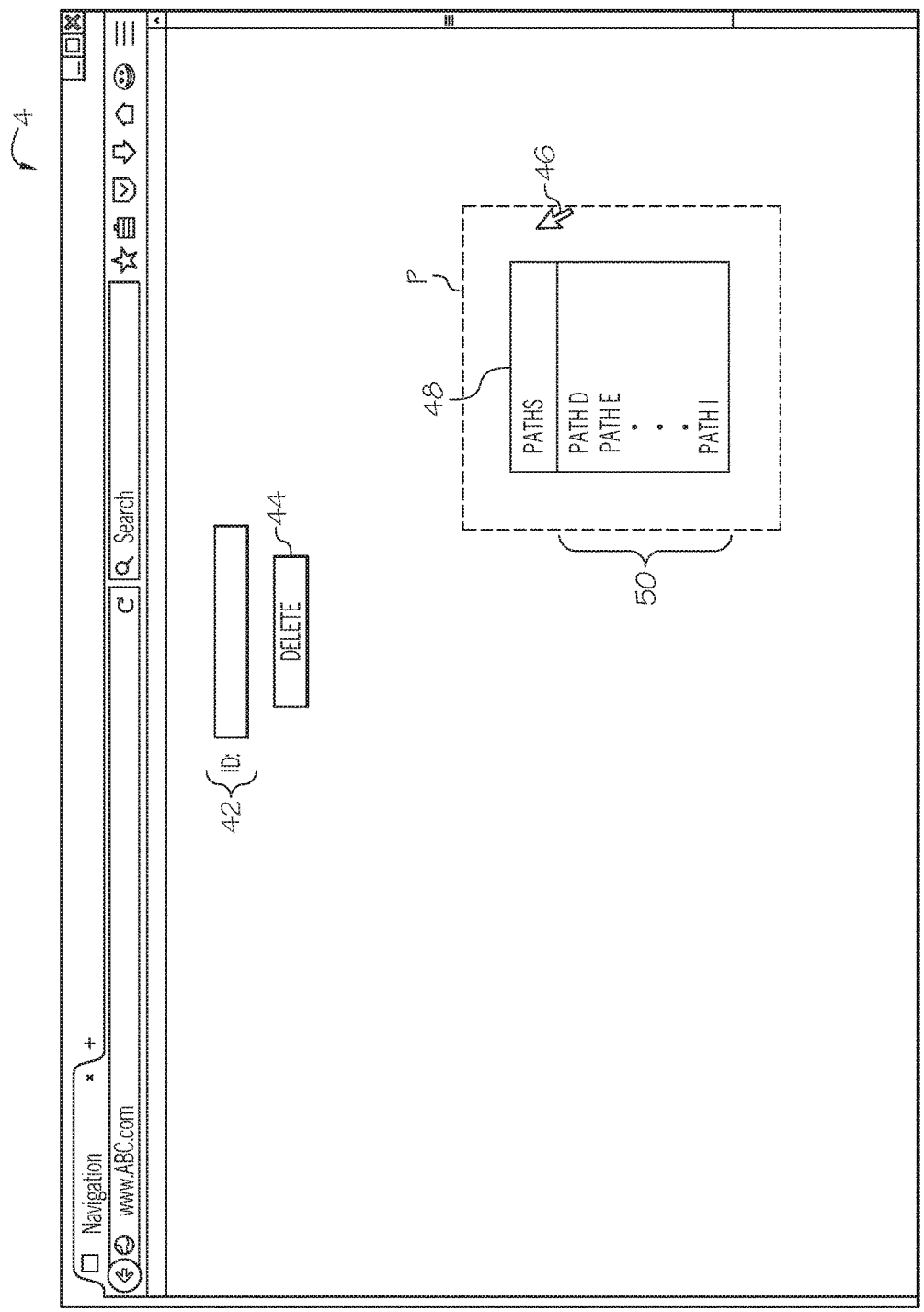

SYSTEM AND METHOD FOR NAVIGATING WEB-BASED APPLICATION PROGRAMS

BACKGROUND

The present disclosure relates generally to computer devices, and more particularly, to computer devices configured to facilitate user navigation through the functionality of a plurality of application programs that comprise an integrated software solution.

Integrated software solutions, also commonly referred to as "enterprise solutions," generally comprise a collection of independent, but intercommunicating, software application programs. Normally, the functions provided by each application program in the "solution" has its own unique Uniform Resource Locator (URL) and set of associated functions that may be invoked by a user. To invoke a desired function (e.g., add, update, delete a record from a database), users typically navigate a "path" through the individual application programs until he/she arrives at a user interface associated with the desired function. However, each time the user wants to perform a desired function, they must remember which application program provides that function, as well as the particular path the user took through the application programs to perform that function.

BRIEF SUMMARY

Embodiments of the present disclosure help users navigate the functions of a plurality of application programs that comprise an integrated solution in order to perform or invoke a desired function. In one embodiment, a communication session is established between a user application executing on a client device and an integrated software solution executing on a server device. The integrated software solution comprises a plurality of interconnected application programs that provide a plurality of functions. User navigation between the functions of the interconnected application programs is monitored, and information associated with the user's navigation to desired target functions is captured and stored in a persistent storage device. A list of navigational paths is then generated from that stored information. Each navigational path corresponds to a target function and comprises a link to the corresponding target function. The list of navigational paths is output to a display device responsive to detecting that a cursor is positioned over a predetermined area of a current user interface.

Embodiments of the present disclosure also provide a computer configured to help users navigate the functions of a plurality of application programs that comprise an integrated solution in order to perform or invoke a desired function. In these embodiments, the computer comprises a communications interface circuit and a processing circuit. The communications interface circuit is configured to communicate data with an integrated solution executing on a server device over a communications session. The integrated solution comprises a plurality of interconnected application programs having a plurality of functions. The processing circuit operatively connects to the communications interface circuit and is configured to monitor user navigation between the plurality of application programs, store information associated with the user's navigation target functions, and generate a list of navigational paths from the stored information. Each navigational path in the list comprises a link to a corresponding target function. Additionally, the processing circuit outputs the list of navigational paths to a display device responsive to detecting that a cursor is positioned over a predetermined area of a current user interface.

Embodiments of the present disclosure also provide a computer-readable storage medium comprising a control application stored thereon. When executed by a processing circuit of a computing device, the control application causes the computing device to establish a communication session with an integrated solution executing on a server device. The integrated solution comprises a plurality of interconnected application programs having a plurality of functions. Additionally, the control application controls the client device to monitor user navigation between the plurality of application programs, store information associated with the user's navigation to target functions, and generate a list of navigational paths from the stored information. Each navigational path in the list comprises a link to a corresponding target function. The control application also outputs the list of navigational paths to a display device responsive to detecting that a cursor is positioned over a predetermined area of a current user interface.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

FIGS. 3A-3D illustrate user interfaces configured according to one embodiment of the present disclosure.

DETAILED DESCRIPTION

Figure 1:
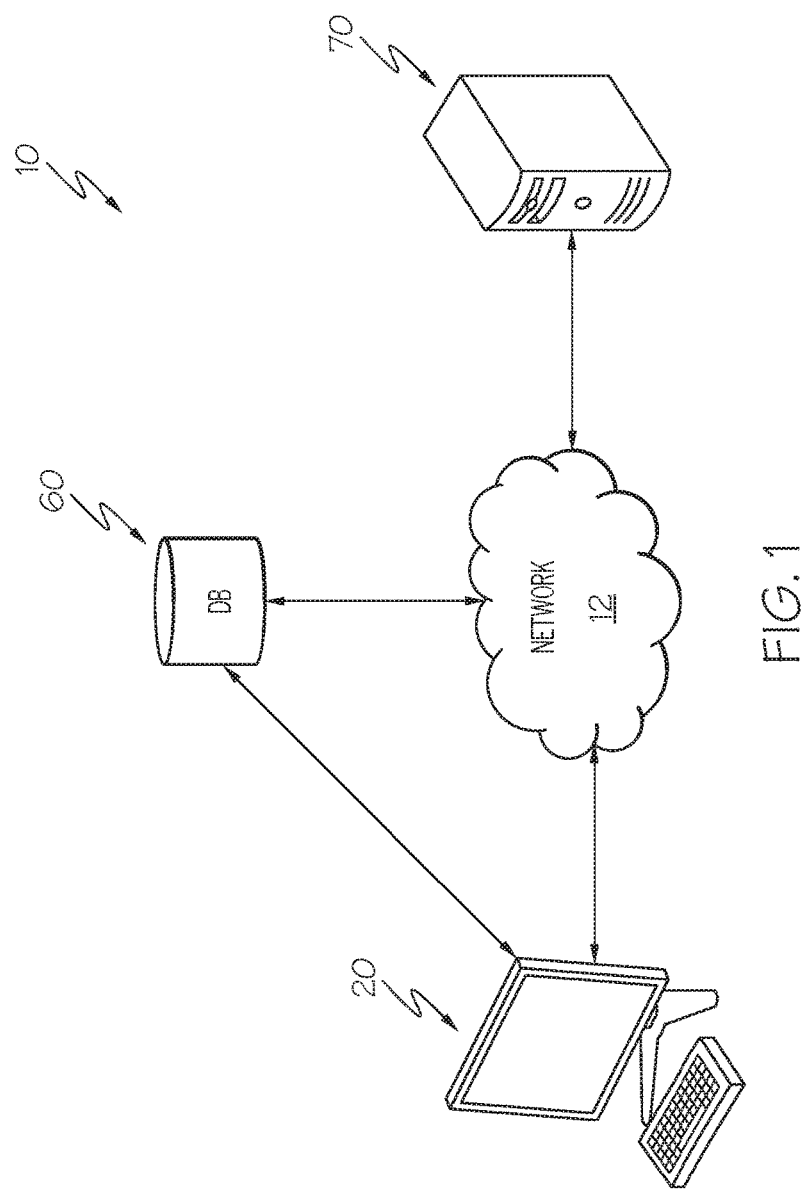
FIG. 1 is a functional block diagram illustrating a computer network configured according to one embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, embodiments of the present disclosure are directed to facilitating user navigation through a plurality of separate, but intercommunicating application programs (i.e., an "integrated solution"), to allow the user to perform desired functions or actions associated with those application programs with minimal effort. In particular, the user's actions are monitored as the user navigates through the functionality of the various application programs that comprise the integrated solution to perform or invoke a desired target function. When the user arrives at a page from which the user may invoke the desired function, embodiments of the present disclosure store the Uniform Resource Link (URL) of the page, any actions the user takes when invoking the desired function from that page (e.g., the actuation of a control, invocation of a command, entry of data, etc.), and other data that may be required for subsequently navigating to and launching the desired target function. This information is then analyzed and stored in persistent storage, such as a database, for example, to subsequently create a list of "navigational paths" for the user. The "navigational paths" in the list represent the functionality the user frequently performs, and comprise the URLs and data needed for the user to navigate directly to the page for a desired function and perform or launch that functionality. Further, the navigational paths in the list are ranked according to their frequency of use by the user. This helps ease user selection of a desired function by ensuring that the functions performed most frequently by the user will be at the top of the list.

Embodiments of the present disclosure provide benefits that conventional processes do not provide. For example, each of the application programs that comprise a given integrated solution has their own separate set of URLs and functionality. As stated above, users can navigate through the different applications to arrive at a desired function, but this often requires the user to remember the "navigational flow" to get to the desired target function. There are many different functions that a user may perform, and thus, it is often times difficult for the user to remember the particular path he/she previously took to get to the desired target function. When it comes to integrated solutions, it is even more difficult because the user must also recall which specific application program provides the desired target function.

However, even when users remember all of this information, they may still need to navigate through one or more "intermediate" application programs to launch the desired target function. Such navigation increases the load on network bandwidth consumption, as well as on the processing resources of the computing system or systems that host the integrated solution. Further, navigation between functions in integrated solutions is strictly unidirectional, meaning that users can navigate to a particular function, but not back from that particular function.

Turning now to the drawings, FIG. 1 is a functional block diagram illustrating a computer system 10 configured according to one embodiment of the present disclosure. System 10 comprises one or more IP networks 12, such as packet data networks, for example, communicatively interconnecting a client device 20, a persistent storage device (DB) 60, and an application server (AS) 70. Although not expressly shown, other network devices, and devices that connect to the networks 12, may be present in system 10 as needed or desired. In operation, the client device 20 (e.g., a computer) executes a client application (e.g., a browser application) that communicates data packets with one or more integrated application programs (i.e., an integrated solution) executing on AS 70. The actual functions provided by the client application and the integrated application programs are not germane to the present embodiments, and may comprise, or be a part of, any software package or packages known in the art. However, in one embodiment, the client application and the integrated application programs of the integrated solution comprise an enterprise solution configured to display, manipulate, and maintain large amounts of complex data, and support the business processes that are associated with that data.

Figure 2:
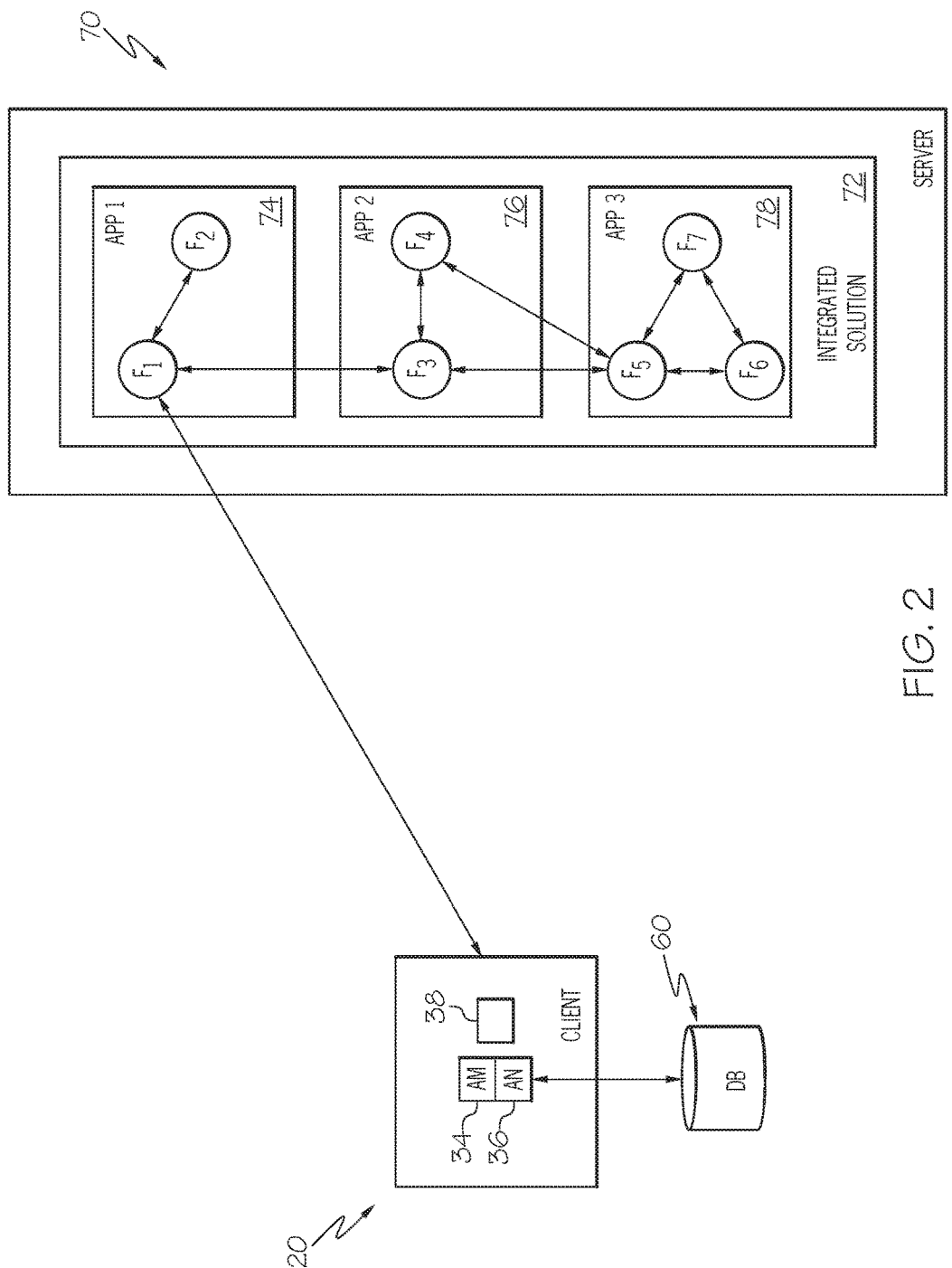
FIG. 2 is a functional block diagram illustrating the interaction between user application processes executing on a client device and an integrated solution executing on a host server according to one embodiment of the present disclosure.

FIG. 2 is a functional block diagram illustrating the application processes that facilitate the embodiments of the present disclosure. Particularly, as seen in FIG. 2, the client device 20 communicatively connects to DB 60 and executes an application monitor (AM) 34, an application navigator (AN) 36, and a browser application 38. The AS 70 hosts an integrated solution 72 (i.e., a software package) comprising a plurality of intercommunicating application programs 74, 76, 78. Each of the application programs 72, 74, 76 further comprise one or more application functions, seen here as $F_1$ thru $F_7$, some of which may or may not communicate with some or all of the other functions $F_1$ thru $F_7$.

According to embodiments of the present disclosure, the browser application 38 provides a user interface (UI) with which a user of client device 20 employs to interact with one or more of the application programs 74, 76, 78 to perform one or more of the functions $F_1$-$F_7$ as needed. For example, using browser application 38, the user may navigate through one or more of the application programs 74, 76, 78 to invoke desired functionality that adds, updates, and deletes enterprise related data.

The AM 34 executes as a background process on client device 20, and performs its functions across all application programs 74, 76, 78. In particular, the AM 34 monitors the user's actions as the user navigates through the application programs 74, 76, 78 of integrated solution 72 to perform or invoke a desired target function $F_1$ thru $F_7$. The AM 34 also obtains and saves whatever data is associated with invoking the desired target function, such as the URL of the page from which the function is launched, as well as any data or user actions that are required to launch the desired target function from that page. Such data and information is stored in DB 60.

For example, as the user navigates to a desired target function, AM 34 monitors the various URLs of the application programs 74, 76, 78 through which the user navigates. Once the user arrives at a page from which the desired function is launched, the URL of that page is identified along with any information that may be required in order to launch the desired function. Such information may be captured, for example, by monitoring the messages communicated between browser application 38 and the application programs 74, 76, 78 of integrated solution 72, and extracting the needed data from those messages. The AM 34 then stores this information in a persistent storage device, such as in DB 60, for example, for subsequent use by the AN 36. Table 1 below illustrates an example of the type of information stored by AM 34 according to one embodiment of the present disclosure.

TABLE 1

| Record No. | URL | Frequency | User | Keywords |
|---|---|---|---|---|
| 1 | http://x:8080/user.html | 1 | Scott | user creation |
| 2 | http://y:9090/tenant.html | 3 | Scott | tenant creation |
| 3 | ... | ... | ... | ... |

As seen in Table 1, AM 34 generates a record for each navigational path. In this case, each record comprises respective columns for a record number, a URL, a Frequency, a User ID, and a list of one or more keywords.

The record number column stores an integer value that is unique for each record. In operation, the record number value functions as a primary key for the table.

The URL column stores the navigational path to a desired target function. Particularly, the URL column contains the link that is placed on the list of navigational paths. The user would select this link to jump directly to the specific page or UI associated with the corresponding target function in one of the application programs 74, 76, 78. As seen in this example, the URL column comprises a single URL that identifies the page associated with the target function. However, the present embodiments are not so limited. In other embodiments, the URL column may comprise an "alias" for the given hyperlink. However, regardless of the particular form of the URL, selection of the link by the user navigates the user directly to the corresponding UI or webpage without having to navigate through one or more intermediary pages.

The Frequency column also stores an integer value that identifies the number of times the user identified in the User ID column has selected the corresponding link in the URL column. As described in more detail later, this count is incremented each time the user identified in the User ID column selects the navigational path identified in the URL column. The more times the user selects the link in the URL column, the higher the value will be in the Frequency column for that link, and the more important that particular UI or function is to the user. The value in the Frequency column, as detailed later, may be utilized to rank the navigational paths in order of importance to the user so that the user is always presented with links that he/she considers most important.

The Keywords column comprises a list of one or more keywords that are utilized to look for a certain navigational path. As described in more detail below, the user may not always find a desired navigational path when those links are displayed to the user by AN 36. This may be due, for example, to the fact that the desired navigational path has a Frequency value that is too low to warrant AN 36 placing the navigational path on the list of navigational paths. However, the user may still search for a given navigational path by entering one or more terms into a UI. Embodiments of the present disclosure will search the DB 60 for keywords in the Keyword column that match, or nearly match, the terms input by the user. If a match or near match is found, the present embodiments will place the navigational path(s) associated with the found keywords in the list of navigational paths. If necessary, the navigational paths that are found for the user in DB 60 will replace a corresponding number of navigational paths already on the list of navigational paths being output to the user.

Those of ordinary skill in the art will appreciate that the information shown in Table 1 is merely exemplary. Other information may be maintained in addition to, or in lieu of, the data in Table 1 as needed or desired.

Regardless of the type or amount of information that is stored by AM 34, AN 36 comprises a process that generates a list of "navigational paths" for display to the user. Each navigational path is generated from the data stored persistently in DB 60, and as seen above, comprises a hyperlink to a corresponding target function. By way of example only, the hyperlinks for the navigational paths may comprise the hyperlinks retrieved from the URL column of a table, such as Table 1 seen above. Additionally, though, the navigational paths may or may not comprise the data that is required by the application program 74, 76, 78 associated with the desired function to launch or invoke that function. Such data may be data processed by the corresponding target function, and may include, but is not limited to, username/password combinations that the user must enter to launch the desired function, data selections, and the like.

As seen in more detail later, the user cannot normally see the list of navigational paths on the UI of browser application 38. That is, even though the list of navigational paths has been generated, it is not output to the display and therefore remains invisible, at least initially, to the user. However, the UI of browser application 38 has one or more predefined "hot spots" areas. Whenever the user positions the mouse cursor over a given "hotspot" area of the UI, the list of navigational paths becomes visible to the user. The user may then select a desired one of the navigational paths on the list to navigate to the user interface of whatever target function corresponds to the selected navigational path, and invoke the function, with minimal effort.

Figure 3B:
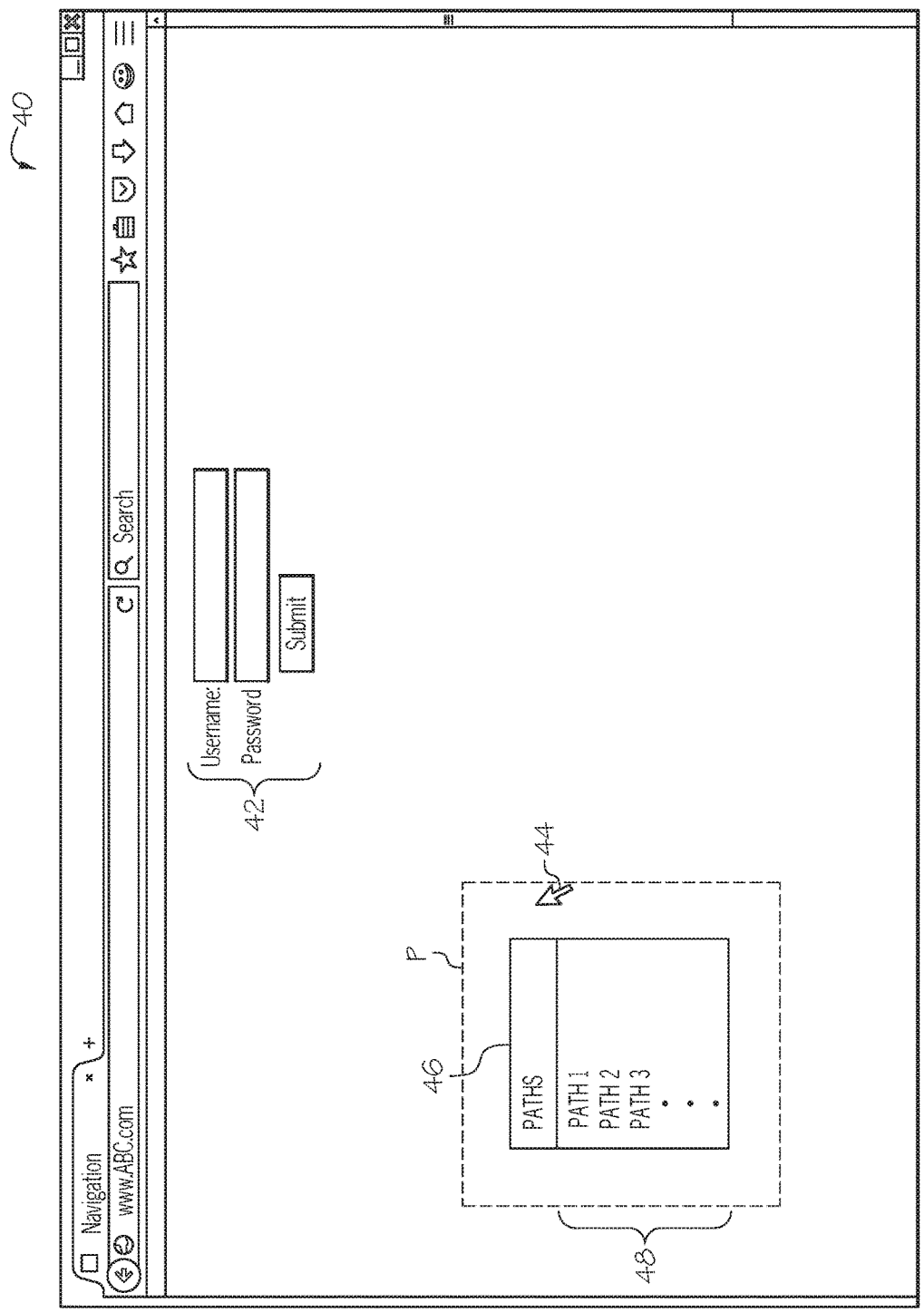

FIGS. 3A-3D illustrate this aspect of the present disclosure in more detail. Particularly, FIG. 3A illustrates a UI 40. In this embodiment, the code defining UI 40 is provided by one of the integrated application programs 74, 76, 78. The browser application 38 receives this code and outputs the UI 40 to the display for the user.

In this embodiment, UI 40 comprises a "home page" where the user begins navigation through the application programs 74, 76, 78 of integrated solution 72 to perform or invoke the various functions $F_1$-$F_7$. Those of ordinary skill in the art will readily appreciate that the actual fields and controls associated with UI 40 may vary, but in this case, the UI 40 comprises a user entry section 42 in which the user provides a username password combination, and a control button 44 (i.e., "SUBMIT") that is utilized to send the data entered into section 42 to the application programs 74, 76, 78 of integrated solution 72. A cursor 46 may be moved across UI 40 and used to give different sections of the UI 40 focus, as is known in the art. By entering the proper username/password combination and clicking on the "SUBMIT" control button 44, the user will register/log on to all application programs 74, 76, 78 of integrated solution 72.

As seen in FIGS. 3A-3B, a list 48 of navigational paths 50 has been generated by AN 36 for the user. Each navigational path 50 in the list 48 comprises a hyperlink that, when selected by the user, navigates the user directly to a particular corresponding function $F_1$-$F_7$ (e.g., a user interface screen associated with the corresponding function) so that the user can invoke that function. As previously stated, the list 48 is not generally visible to the user, as seen in FIG. 3A. However, when AN 36 detects that the user has positioned the cursor 46 over a predetermined area P of UI 40 (see FIG. 3B), AN 36 makes the list 48 and its contents visible to the user. Further, the list 48 of navigational paths 50 will remain visible to the user so long as the computer executing the present embodiments detects that the cursor 46 remains positioned over the predetermined area P.

Responsive to detecting a user selection of a navigational path 50 (e.g., PATH 1) from the list 48 on FIG. 3B, the browser application 38 is controlled to navigate the user directly to the UI 41a of FIG. 3C with minimal effort. Further, the navigational path 50 selected by the user comprises all the data and information needed to automatically the desired function.

For example, consider a situation in which the ADD ID functionality seen in FIG. 3C corresponds to function $F_7$ seen in FIG. 2. In such cases, the data and information associated with the selected navigational path 50 comprises all the data and information that is required to navigate the user from the home page UI 40 of FIG. 3B directly to UI 41a and function $F_7$ of the "destination" application program 78. As stated previously, the data and information needed for invoking the desired target function was collected and persistently stored by AM 34 when the user initially navigated from the "home page" associated with UI 40 to application program 78 associated with UI 41a and function $F_7$. Thus, other than to select a corresponding navigational path 78 from list 46 that corresponds to the target function $F_7$, the present embodiments do not require the user to repeat re-entering the information or perform the same action(s) previously performed to arrive at the target function $F_7$ of application program 78. This enables the user to quickly and easily navigate to a desired application program and function with just a single "click" on one of the navigational paths 50 of list 48. However, in some cases, it may not make sense to simply re-use the same information. Therefore, in some embodiments, selecting the navigational path may directly navigate the user to UI 41a, but require the user to provide the particular ID to add in the data entry area 42 and click the command button 44 (i.e., the "ADD" button) to perform the desired function (e.g., add the ID to a database).

In addition to navigating "forward" through the application programs (e.g., from the home page UI 40 to the "ADD ID" UI 41a of application program 78), embodiments of the present disclosure also permit the user to navigate "backwards" through the application programs 74, 76, 78 of integrated solution 72. For example, consider a case in which the user wishes to navigate from UI 41a associated with the "ADD ID" function $F_7$ of application program 78 to a UI 41b associated with a "DELETE ID" function $F_4$ provided by application program 76 (see FIG. 3D). The user would need only to position the cursor 46 over predetermined area P of UI 41a to make the list 48 visible to the user, and then select the navigational path 50 associated with navigating to function $F_4$ (e.g., PATH A). Responsive to the user's selection of the navigational path 50, the present embodiments would navigate the user from the UI 41a of function $F_7$ directly to the UI 41b associated with function $F_4$ (see FIG. 3D).

As above, the navigational path 50 selected by the user "jumps" the user to function $F_4$ and comprises all the data and information needed to invoke function $F_4$. Further, such data and information was collected and stored by AM 34 whenever the user initially navigated to function $F_4$ from function $F_7$. Thus, the user is not required to enter or re-enter any data or information associated with navigating through function $F_5$ or otherwise interact with function $F_5$ to facilitate this "jump" process. Once the user is presented with the UI 41b associated with function $F_4$ (i.e., the DELETE ID functionality), the user need only to provide the particular ID to delete in the text entry area 42, and actuate the command button 44.

According to embodiments of the present disclosure, the navigational list 48 is not anchored to any particular position on the UI. Rather, the list 48 and its contents may be moved around to different places on the UI by the user, for example, using "drag-n-drop" functionality. Such movement is beneficial because of the different UIs presented to the user at client device 20. That is, different UIs typically place various objects, such as text entry fields, controls, and the like, at different positions on the UIs. Thus, providing the ability to move the list 48 around the UIs the user allows those users to position the list 48 so that it does not obscure any of the objects displayed on the UIs.

Additionally, as seen in FIGS. 3C-3D, the predetermined area P over which the cursor 46 must be positioned in order to make list 48 visible to the user moves with, and remains adjacent to, list 48. However, those of ordinary skill in the art will readily appreciate that this is merely illustrative. The predetermined areas P over which the cursor 46 must hover to make list 48 visible to the user may also be located, at least initially, at a default fixed position on the UIs (e.g., at the top left corner of the UI). Such placement helps to ensure that a user will always know where to hover mouse cursor 46 to make the list 48 visible to the user. Once initially located, the user may move the list 48 around the UI to any position needed or desired.

Figure 4:
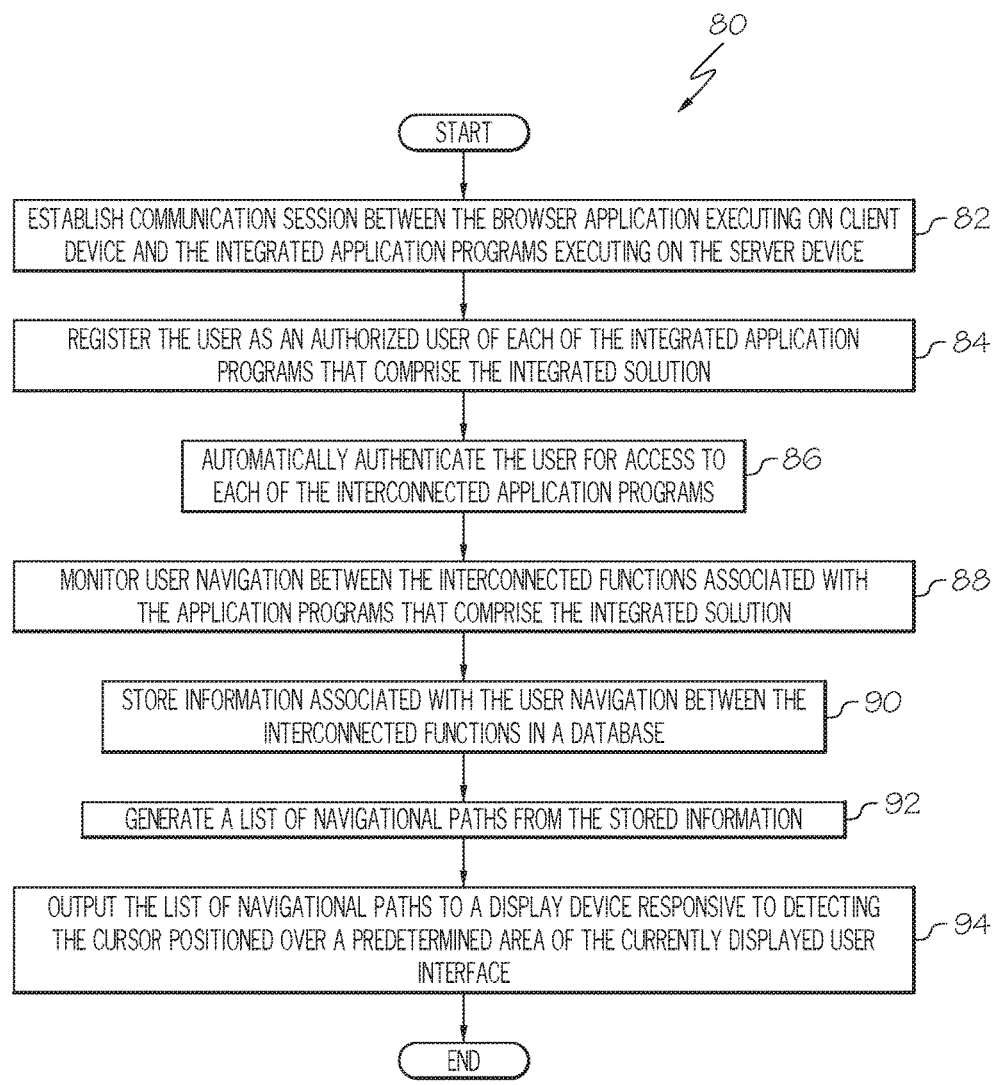
FIG. 4 is a flow chart illustrating a method for monitoring user actions while navigating through an integrated solution for use in generating a list of navigational paths according to one embodiment of the present disclosure.

FIG. 4 is a flow chart illustrating a method 80 for monitoring and saving data related to user navigation through the application programs 74, 76, 78 of the integrated solution 72 to perform a corresponding function, and for using that stored information to generate the list 48 of navigational paths 50 according to one embodiment of the present disclosure. In the embodiment of FIG. 4, method 80 is implemented at the client device 20 by the AM 34 and the AN 36.

Method 80 begins with the client device 20 establishing a communication session between the browser application 38 executing the client device 20 and the integrated solution 72 executing on AS 70 (box 82). Establishing communications may occur using any process known in the art, and in some cases, may be controlled by the particular application program 74, 76, 78 that is associated with the integrated solution 72. However, it should be understood that the established communication session is consistent across all of the application programs 74, 76, 78 comprising the integrated solution 72 on AS 70. This helps to ensure that the user can navigate to the functions associated with the different application programs 74, 76, 78.

Regardless, responsive to the successful completion of the registration process, the user is registered as an authorized user with all of the application programs 74, 76, 78 (box 84), and authenticated for access to all of the application programs 74, 76, 78 (box 86). The authentication procedure may be implemented using any process known in the art, but in at least one embodiment, is automatically performed for the user once the user is successfully registered and has provided the appropriate credentials, such as a username/password combination, for example.

Thereafter, AM 34, which as stated previously executes as a background process on client device 20, monitors the user navigation and actions between the interconnected functions $F_1$-$F_7$ of the integrated application programs 74, 76, 78 (box 88). For example, in some embodiments of the present disclosure, AM 34 comprises a so-called "listener" function configured to intercept the messages that are communicated between the browser application 38 and the application programs 74, 76, 78. This "listener" function of AM 34 does not interfere with the user's command and control of the application programs 74, 76, 78. Rather, it simply extracts the data and information that is associated with the user navigating from a currently displayed UI 40 (e.g., the home page of browser application 38) to the UI of whichever integrated application program 74, 76, 78 is associated with a desired one of the functions $F_1$-$F_7$ (e.g., UI 41a). Such data and information includes, but is not limited to, the URL of the particular UI associated with the desired target function, as well as any data and parameters that the user may enter into data entry fields displayed on the UI, and that are associated with actuating the controls displayed on the UI to invoke the desired target function. Regardless of the type and amount of information that is extracted, however, AM 34 stores that information in a persistent manner in DB 60 regardless of the direction of navigation (box 90).

At some point, the user may wish to navigate to a UI 40 associated with a desired one of the functions $F_1$-$F_7$. Rather than repeating the same set of steps and actions to navigate to the target function, however, the user may simply "jump" directly to the UI associated with the desired function by selecting the navigational path 50 that is associated with that particular function.

To accomplish this, the AN 36 first generates the list 48 of navigational paths 50 using the data and information stored in DB 60 (box 92). The list 48 may be generated at any time, but in one embodiment, is automatically generated for each separate UI 40, 41a, 41b whenever the user arrives at the UI. Further, since the user navigation is different for each UI 40, 41a, 41b (i.e., the user begins and ends at different UIs for different functions), the list 48 may comprise different navigational paths 50 for each UI 40, 41a, 41b. Nevertheless, the list 48 remains invisible to the user at each UI 40, 41 until the user positions the mouse cursor 46 over the predetermined area P (e.g., a "hotspot"). Once AN 36 detects that the cursor 46 is over the predetermined area P, AN 36 generates the commands needed to make the list 48 visible to the user (box 94). The list 48 and its contents will remain visible to the user so long as the cursor 46 remains positioned over the predetermined area P. Once the user moves the cursor 46 away from that predetermined area P, the list 48 and its contents will again become invisible to the user.

The size of the predetermined area P is limited, although that size may be any size needed or desired. Further, the predetermined area P may be located at any position on its UI so long as it is proximate the list 48. Initially, the list 48 will be invisible to the user. Therefore, embodiments of the present disclosure may initially position the list 48 in a default area of the UI. This way, the user would always know where to place the cursor 44 to make the list 46 visible. Thereafter, the user would be able to position the list 48, and thus, the corresponding predetermined area P, anywhere on the UI.

Figure 5:
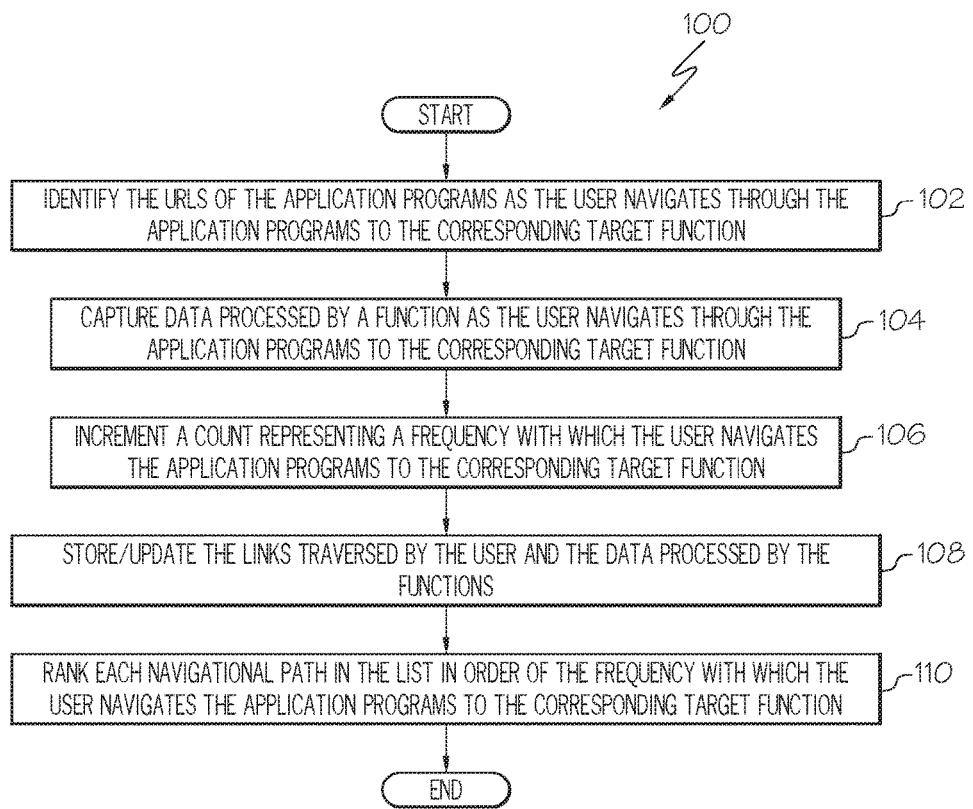
FIG. 5 is a flow chart illustrating a method for generating a list of navigational paths according to one embodiment of the present disclosure.

FIG. 5 is a flow chart illustrating a method 100 for generating the list 48 of navigational paths 50 from the information stored in DB 60 according to one embodiment of the present disclosure. As above, the method 100 of FIG. 5 is implemented by the AM 34 at the client device 20.

Method 100 begins with AM 34 identifying the URLs of each application program 74, 76, 78 and associated function $F_1$-$F_7$ as the user navigates through the various application programs 74, 76, 78 to the desired target function (box 102). Additionally, AM 34 captures any data that is processed by a function as the user navigates to the desired target function (box 104). By way of example, when initially navigating to a desired function, the user may be required to execute one or more intermediate functions. Such intermediate functions may require the user to provide data that it processes, or may autonomously retrieve information that it processes. In either case, embodiments of the present disclosure identify the data associated with the intermediate functions and their associated URLs, and extracts that data (e.g., from the messages communicated between browser application 38 and the application programs 74, 76, 78).

However, embodiments of the present disclosure will only store the URL of the "destination" UI associated with the desired target function, and the data and actions performed to invoke that function from that destination UI. The URLs and data associated with the intermediate functions and their associated URLs (i.e., those the user navigates through to get to the UI associated with the target function) are not stored persistently.

In addition to identifying and collecting the information that will be utilized in generating the individual navigational paths 50, embodiments of the present disclosure also maintain metrics representing how frequently the user navigates to the function(s) associated with each generated navigational path 50 (box 106). In one embodiment, for example, the AM 34 increments an integer value each time the user navigates to a given function. The integer value is stored and maintained with the data in DB 60 as part of the navigational path 50 data for that function (box 108), and thereafter, used to rank each navigational path 50 in the list 48 in order of how frequently the user navigates to that function (box 110). This allows the AN 36 to position the navigational paths 50 most frequently navigated to by the user at or near the top of the list 48 when it generates the list 48.

In some embodiments, a threshold value may be defined for use in determining which of the navigational paths 50 are placed on the list 48. For example, the list 48 may be generated to include only those navigational paths 50 having a frequency count greater than n. In other embodiments, list 48 may be generated to include the top n-ranked navigational paths 50. Of course, in other embodiments of the present disclosure, a combination of these two methods may be utilized when determining which navigational paths 50 are to be placed into the list 48. Additionally, the present disclosure may configure the AM 34 and/or AN 36 to autonomously replace or remove navigation paths 50 that are on list 48 if it is determined that the frequency with which the user navigates to those particular function decreases. Thus, list 48 is always kept up-to-date.

Figure 6:
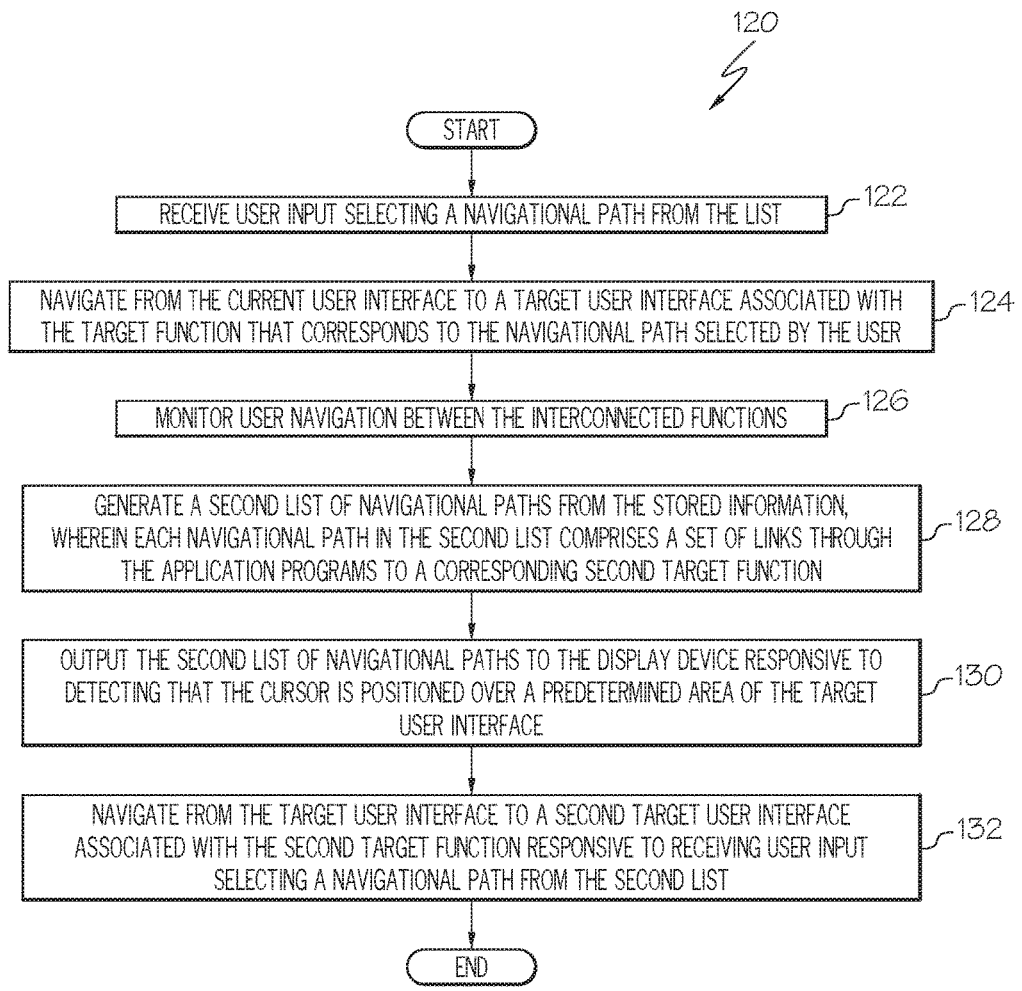
FIG. 6 is a flow chart illustrating a method for navigating to a function using the navigational paths generated according to one embodiment of the present disclosure.

FIG. 6 is a flow chart illustrating a method 120 for navigating to a function using the navigational paths 50 generated according to one embodiment of the present disclosure. In this embodiment, method 120 is implemented by AN 36 at the client device.

Method 120 begins with AN 36 receiving user input selecting a navigational path 50 from the list 48 (box 122). Responsive to the selection, AN 36 navigates the user from the current UI 40 (e.g., the home page) directly to the UI of the target function (e.g., UI 41a) associated with the selected path 50 (box 124). Thereafter, regardless of whether the user actually performs the target function, AM 34 continues to monitor the user's actions and navigation relative to the target UI 41a through the application programs 74, 76, 78, as previously described (box 126). AN 36 further generates (and/or updates) the list 48 relative to the target UI 41a to include navigational paths 50 that the user frequently utilizes to navigate to other functions (box 128). Responsive to detecting that the cursor 46 is hovering over a predetermined area P of the target UI 41a (e.g., adjacent list 48), AN 36 makes the list 48 with the navigational paths 50 visible to the user (box 130). As above, the list 48 will remain visible to the user as long as cursor 46 hovers over the predetermined area. Responsive to receiving a user selection of a navigational path 50, the AN 36 navigates the user from the target UI 41a (i.e., the currently displayed user interface) to a new target interface (e.g., UI 41b) of the function associated with the selected navigational path 50 (box 124).

Thus, the AM 34 and AN 36 may be configured to generate and maintain multiple lists 48—one list 48 for each respective UI. Further, each navigational path 50 in each list 48 may be associated with a corresponding function to which the user frequently navigates from the current UI.

Figure 7:
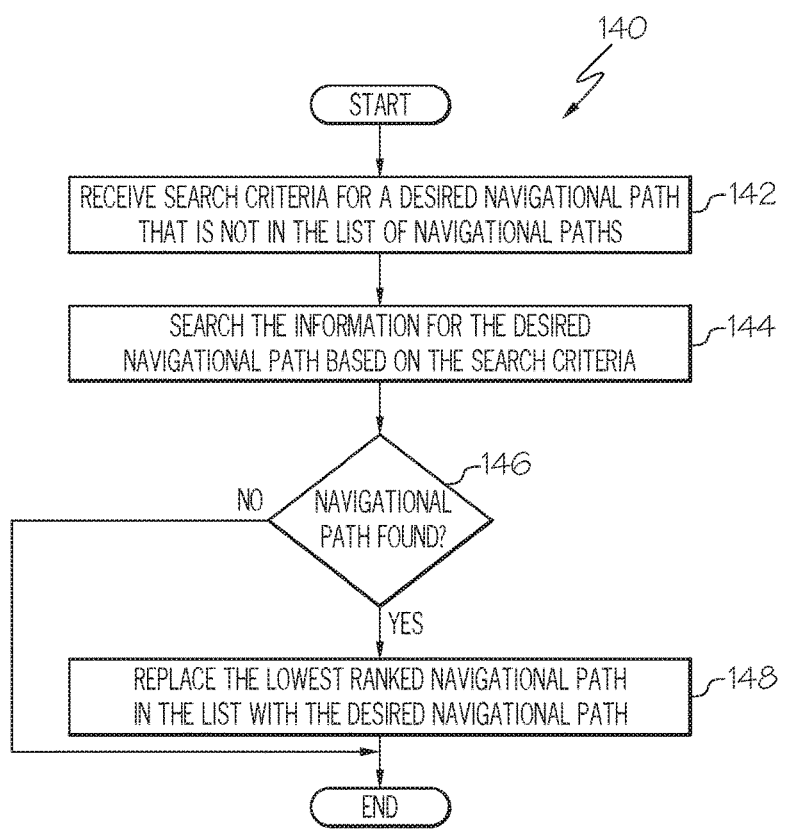
FIG. 7 is a flow chart illustrating a method for locating a navigational path generated according to one embodiment of the present disclosure.

In some situations, a given list 48 may not include the navigational path 50 desired by the user. This could be because the user does not frequently navigate to the function associated with that path 50, or because that path 50 has not yet been created. However, as seen in FIG. 7, the present embodiments provide a method 140 for locating navigational paths 50 that are not on the list 48 for a given UI 40, 41.

Particularly, AN 36 is configured to receive one or more search criteria related to a navigational path 50 (box 142). The criteria may include, for example, the name or ID of a desired function, application, or the like. Responsive to receiving the criteria, AN 36 will search the DB 60 for navigational paths 50 that match, or nearly match, the received criteria (box 144). If a navigational path 50 is not located in the DB 60 (box 146), the method simply ends. Otherwise, if a navigational path 50 that matches the criteria is located in the DB 60 (box 146), AN 36 will place that navigational path 50 into list 48 (box 148).

The order in which the newly located path 50 is placed into list 48 varies based on the navigational paths that are already on the list 48. Particularly, if there is room on the list for additional paths 50, the AN 36 will simply add the navigational path 50 matching the user's criteria onto the bottom of the list 48. However, if there is no room on the list 48 for any additional navigational paths 50, AN 36 will replace the lowest ranked path 50 on list 48 with the newly located path 50. This helps to ensure that list 48 always provides the user with the most up-to-date listing of paths 50 that are utilized by the user most frequently.

Figure 8:
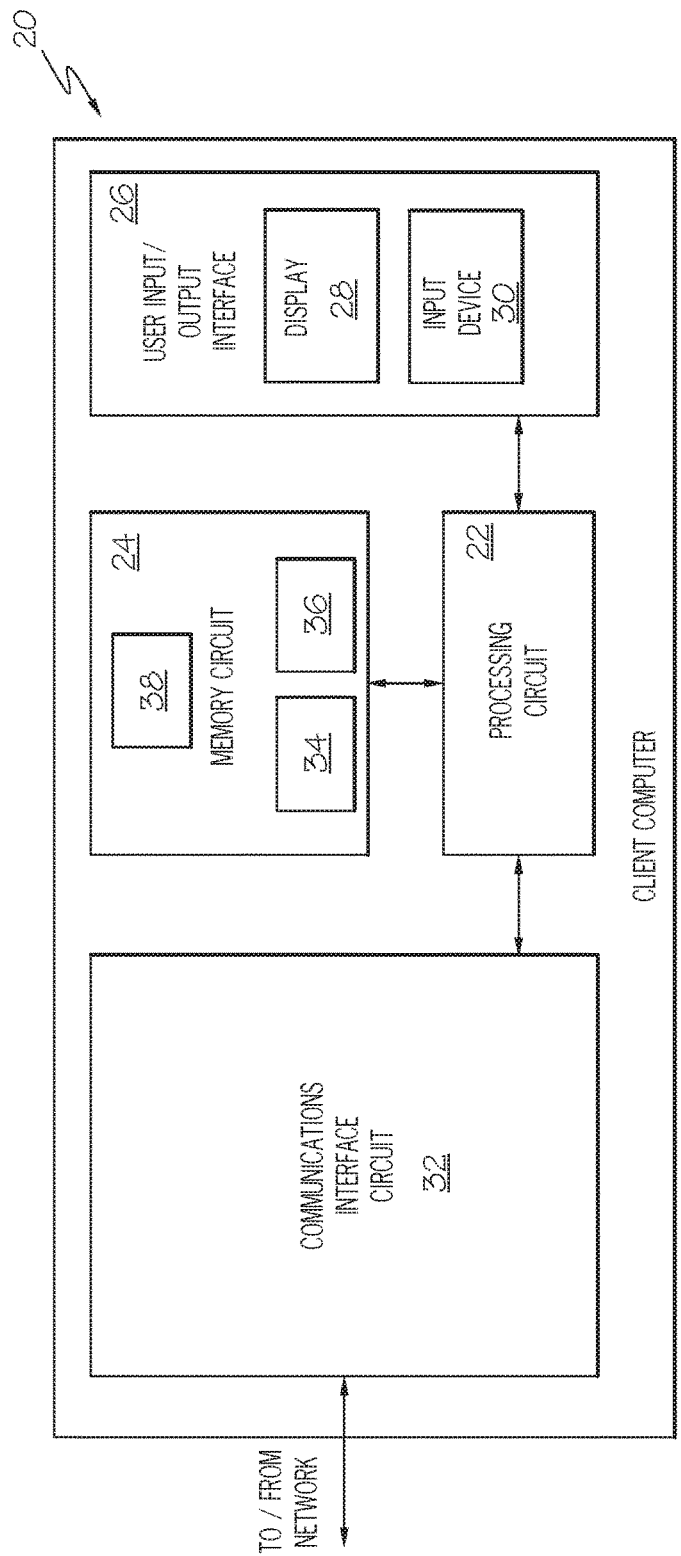
FIG. 8 is a functional block diagram illustrating a client computer configured according to one embodiment of the present disclosure.

FIG. 8 is a functional block diagram illustrating a client device 20 configured according to one embodiment of the present disclosure. As seen in FIG. 8, client device 20 is a computer terminal comprising a processing circuit 22, a memory circuit 24 that stores the AM 34, the AN 36, and the browser application 38, a user input/output (I/O) interface comprising a display device 28 and an input device 30 (e.g., keyboard, mouse), and a communications interface circuit 32.

The memory circuit 24 comprises any non-transitory computer-readable medium (e.g., RAM, ROM, CD, and/or other hardware circuitry) configured to store the instructions and data that comprise the AM 34, the AN 36, and the browser application 38. Similarly, the processing circuit 22 also comprises hardware circuitry (e.g., one or more microprocessors) configured to execute the instructions that comprise the AM 34, the AN 36, and the browser application 38, thereby controlling the client device 20 to perform the functionality discussed above. The communications interface circuit 32 comprises, for example, an ETHERNET card or other circuit configured to communicate data and information with each of the application programs 74, 76, 78 that comprise the integrated solution 72 hosted by AS 70.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method, comprising:
monitoring activity between a user application executing on a client device and an integrated software platform executing on a server device, wherein the integrated software platform includes a plurality of interconnected application programs providing a plurality of functions, wherein the activity includes user navigation to selected ones of the plurality of functions provided by one or more of the plurality of interconnected application programs;
based on the monitoring, storing information associated with the user navigation to the selected functions;
based on the stored information, generating a list of navigational paths associated with one or more of the selected functions, wherein each navigational path in the list includes a hyperlink to a user interface associated with a corresponding function, and wherein each navigational path in the list is ranked according to a frequency with which the user selects the navigational path to navigate to the selected functions;
detecting that a cursor is positioned over a predetermined area of a current user interface of the user application;
in response to the detecting, providing, via the user application, a navigation interface displaying the list of navigational paths;
receiving search criteria for a desired navigational path that is not in the list of navigational paths;
searching the information for the desired navigational path based on the search criteria; and
responsive to finding the desired navigational path, replacing at least one navigational path in the list with the desired navigational path.

2. The method of claim 1, further comprising:
for each navigational path in the list, maintaining a count value indicative of the frequency with which the user navigates to the corresponding function; and
ranking each navigational path in the list in order of the frequency.

3. The method of claim 1, wherein the monitoring the activity includes:
identifying one or more intermediary hyperlinks traversed by the user as the user navigates through the plurality of interconnected application programs to the selected functions; and
capturing data processed by one or more of the plurality of functions as the user navigates to the selected functions.

4. The method of claim 3, wherein the storing the information associated with the user navigation includes storing the hyperlinks to the user interfaces associated with the selected functions.

5. The method of claim 3, wherein each navigational path in the list further includes the data processed by the corresponding function.

6. The method of claim 1, further comprising:
receiving user input selecting a navigational path from the list; and
navigating from the current user interface to a target user interface associated with a target function that corresponds to the navigational path selected by the user.

7. The method of claim 6, further comprising:
generating a second list of navigational paths from the stored information, wherein each navigational path in the second list includes a hyperlink to a corresponding second function; and
providing, via the navigation interface, the second list of navigational paths responsive to detecting that the cursor is positioned over the predetermined area.

8. The method of claim 1, further comprising:
registering the user as an authorized user of the integrated software platform; and
responsive to registering the user as an authorized user of the integrated software platform, automatically authenticating the user to access the plurality of interconnected application programs.

9. The method of claim 1, further comprising:
updating the list of navigational paths responsive to the user navigation to the selected functions.

10. The method of claim 1, wherein the at least one navigational path is the lowest ranked navigational path in the list.

11. The method of claim 1, wherein at least one hyperlink included in the list of navigational paths is presented using an alias identifier.

12. A system, comprising:
at least one processor; and
a non-transitory, computer-readable medium having instructions stored thereon that are executable by the at least one processor to perform operations comprising:
monitoring activity between a user application executing on the system and an integrated software platform executing on a server device, wherein the integrated software platform includes a plurality of interconnected application programs providing a plurality of functions, wherein the activity includes user navigation to selected ones of the plurality of functions provided by one or more of the plurality of interconnected application programs;
based on the monitoring, storing information associated with the user navigation to the selected functions;
based on the stored information, generating a list of navigational paths associated with one or more of the selected functions, wherein each navigational path in the list includes a hyperlink to a user interface associated with a corresponding function, and wherein each navigational path in the list is ranked according to a frequency with which the user selects the navigational path to navigate to the selected functions;
detecting that a cursor is positioned over a predetermined area of a current user interface of the user application;
in response to the detecting, providing, via the user application, a navigation interface displaying the list of navigational paths;
receiving search criteria for a desired navigational path that is not in the list of navigational paths;
searching the information for the desired navigational path based on the search criteria; and
responsive to finding the desired navigational path, replacing at least one navigational path in the list with the desired navigational path.

13. The system of claim 12, wherein the operations further comprise:
for each navigational path, maintaining a count value indicative of the frequency with which the user navigates to the corresponding function; and
ranking each navigational path in the list in order of the frequency.

14. The system of claim 12, wherein monitoring the user navigation to the selected functions includes:
identifying one or more intermediary hyperlinks traversed by the user as the user navigates through the plurality of interconnected application programs to the selected functions; and
capturing data processed by an intermediary function as the user navigates to the selected functions.

15. The system of claim 14 wherein storing the information associated with the user navigation includes storing the hyperlinks of the user interfaces associated with the selected functions.

16. The system of claim 12, wherein the operations further comprise:
receiving user input selecting a navigational path from the list; and
navigating to a target user interface associated with a target function that corresponds to the navigational path selected by the user.

17. The system of claim 12 wherein the operations further comprise:
registering the user as an authorized user of the integrated software platform; and
responsive to registering the user as an authorized user of the integrated software platform, automatically authenticating the user to access the plurality of interconnected application programs.

18. The system of claim 12 wherein the operations further comprise updating the list of navigational paths responsive to the user navigation to the selected functions.

19. A non-transitory, computer-readable medium having instructions stored thereon that are executable by a computing device to perform operations comprising:
monitoring activity between a user application executing on the computing device and an integrated software platform executing on a server device, wherein the integrated software platform includes a plurality of interconnected application programs providing a plurality of functions, wherein the activity includes user navigation to selected ones of the plurality of functions provided by one or more of the plurality of interconnected application programs;
based on the monitoring, storing information associated with the user navigation to the selected functions;
based on the stored information, generating a list of navigational paths associated with one or more of the selected functions, wherein each navigational path in the list includes a hyperlink to a user interface associated with a corresponding target function, and wherein each navigational path in the list is ranked according to a frequency with which the user selects the navigational path to navigate to the selected functions;
detecting that a cursor is positioned over a predetermined area of a current user interface of the user application; and in response to the detecting, providing, via the user application, a navigation interface displaying the list of navigational paths;

receiving search criteria for a desired navigational path that is not in the list of navigational paths;

searching the information for the desired navigational path based on the search criteria; and responsive to finding the desired navigational path, replacing at least one navigational path in the list with the desired navigational path.

20. The non-transitory, computer-readable medium of claim 19, wherein the at least one navigational path is the lowest ranked navigational path in the list.

* * * * *